(12) United States Patent
Lee

(10) Patent No.: US 8,699,980 B2
(45) Date of Patent: Apr. 15, 2014

(54) CAR AUDIO SYSTEM INCLUDING AN INTEGRATED MODULE COMPRISING A TUNER UNIT AND AN ACTIVE ANTENNA

(75) Inventor: Kyu Young Lee, Seoul (KR)

(73) Assignee: Kwang Sung Electronics Korea Co., Ltd., Gunpo (KR)

( * ) Notice: Subject to any disclaimer, the term of this patent is extended or adjusted under 35 U.S.C. 154(b) by 0 days.

(21) Appl. No.: 13/698,626

(22) PCT Filed: May 16, 2011

(86) PCT No.: PCT/KR2011/003580
§ 371 (c)(1),
(2), (4) Date: Nov. 16, 2012

(87) PCT Pub. No.: WO2011/145846
PCT Pub. Date: Nov. 24, 2011

(65) Prior Publication Data
US 2013/0059555 A1 Mar. 7, 2013

(30) Foreign Application Priority Data
May 19, 2010 (KR) .......................... 10-2010-0047102

(51) Int. Cl.
*H04B 1/18* (2006.01)
(52) U.S. Cl.
USPC ............... 455/193.1; 455/333; 455/575.7; 343/713
(58) Field of Classification Search
USPC ........ 455/193.1, 313, 323, 333, 571.1, 575.5, 455/575.7; 343/711, 713
See application file for complete search history.

(56) References Cited

U.S. PATENT DOCUMENTS

| 2005/0195335 A1* | 9/2005 | Gomez et al. ................. 348/707 |
| 2007/0120757 A1* | 5/2007 | Ogino et al. .................. 343/713 |
| 2010/0253851 A1* | 10/2010 | Itou et al. ..................... 348/607 |

FOREIGN PATENT DOCUMENTS

| JP | 2002-135668 A | 5/2002 |
| JP | 2004-328351 A | 11/2004 |
| KR | 10-2007-0027342 A | 3/2007 |
| KR | 10-2007-0027350 A | 3/2007 |

OTHER PUBLICATIONS

International Search Report for PCT/KR2011/003580.

* cited by examiner

*Primary Examiner* — Nhan Le
(74) *Attorney, Agent, or Firm* — LRK Patent Law Firm

(57) ABSTRACT

A car audio system having a tuner unit and an active antenna integrated into a single module, the car audio system being connected to an antenna for a vehicle and receiving broadcast signals, is provided. The car audio system includes an antenna-tuner integration module, in which the active antenna for receiving and amplifying the broadcast signals and the tuner unit for selecting a broadcast signal corresponding to a specific frequency among the received broadcast signals are formed as a single module; and a car audio device connected to the antenna-tuner integration module using a data cable of a certain length corresponding to a spaced distance for preventing effects of electrical noise generated by the vehicle.

4 Claims, 4 Drawing Sheets

CAR AUDIO SYSTEM INCLUDING AN INTEGRATED MODULE COMPRISING A TUNER UNIT AND AN ACTIVE ANTENNA

TECHNICAL FIELD

The present invention relates to a car audio system having a tuner unit and an active antenna integrated into a single module, and more specifically, to a car audio system having a tuner unit and an active antenna integrated into a single module, in which the active antenna for receiving and amplifying broadcast signals and the tuner unit for selecting a broadcast signal corresponding to a specific frequency among the received broadcast signals are formed as a single module, and thus broadcast receive sensitivity is improved.

BACKGROUND ART

Hereinafter, the background art will be described with reference to FIGS. 1 and 2.

FIG. 1 is a view schematically showing the configuration of a conventional car audio system in which a passive antenna for a vehicle is connected to a car audio device through a coaxial cable.

As shown in FIG. 1, when a passive antenna is used as an antenna for a vehicle, the gain of the antenna is improved. However, since the antenna protruding toward outside is formed to have a length satisfying a frequency band for operating broadcast signals, it is not good for outer appearance of the vehicle, and physical damage is worried. In addition, if a driving gear for adjusting the length of the antenna operates when the power of the car audio device is turned on and off, cost of the car audio device is increased, and risk of failure is also increased.

In addition, since the broadcast signals received through the passive antenna are transferred to a broadcast tuner embedded in the car audio device through a coaxial cable, the received broadcast signals can be degraded in correspondence to the loss rate of the broadcast signals transferred through the coaxial cable.

FIG. 2 is a view schematically showing the configuration of a conventional car audio system in which an active antenna for vehicle is connected to a car audio device through a coaxial cable.

As shown in FIG. 2, the car audio system in which an active antenna is connected to a car audio device through a coaxial. Cable is a car audio system using an active antenna which is referred to as a Glass antenna or a Micro antenna. The car audio system uses a low noise amplification unit to improve receive sensitivity of the antenna, and accordingly, a separate power line is needed to supply power.

Here, when an active antenna is used, the antenna size is reduced compared with the case of using a passive antenna, and thus physical damage can be prevented, and aesthetic sense of the outer appearance is improved. In addition, sine a low noise amplification unit is used, reduction in the receive sensitivity caused by the reduction in the antenna size is compensated.

However, even when the active antenna is used, the broadcast signals are degraded since the broadcast signals are transferred to the tuner unit embedded in the car audio device through a coaxial cable.

That is, in the conventional car audio system in which an antenna for a vehicle transfers the broadcast signals to the tuner unit embedded in the car audio device through a coaxial cable, a coaxial cable of 75Ω having a length around 5 meters is used to transfer the received broadcast signals to the car audio device, and thus cable loss occurs. In addition, since the car audio device is arranged near the engine room of the vehicle, the tuner unit mounted on the car audio device is affected by electrical noise, which is generated by the engine or the driving motor of the vehicle to have a frequency band close to a broadcast frequency, and thus receive sensitivity of the broadcast signals is degraded.

Accordingly, a practical and useful technique for preventing the cable loss generated in the coaxial cable connecting the antenna and the car audio device of the vehicle and improving the receive sensitivity of the broadcast signals is earnestly required.

DISCLOSURE OF INVENTION

Technical Problem

Therefore, the present invention has been made in view of the above problems, and it is an object of the present invention to provide a car audio system having a tuner unit and an active antenna integrated into a single module, in which the active antenna for receiving and amplifying broadcast signals and the tuner nit for selecting a broadcast signal corresponding to a specific frequency among the received broadcast signals are formed as a single antenna-tuner integration module, and thus cable loss is prevented, and broadcast receive sensitivity is improved.

Another object of the present invention is to prevent degradation of receive sensitivity of broadcast signals by connecting the antenna-tuner integration module and the car audio device using a data cable so that a distance between the antenna-tuner integration module and the car audio device may have a certain length corresponding to a spaced distance for preventing effects of electrical noise generated by the vehicle.

Still another object of the present invention is to reduce manufacturing cost and improve a working process by including multiplexer/demultiplexer circuits at predetermined positions in the antenna-tuner integration module and the car audio device and thus reducing the number of lines used in the data cable connecting the antenna-tuner integration module and the car audio device.

Technical Solution

To accomplish the above objects, according to one aspect of the present invention, there is provided a car audio system having a tuner unit and an active antenna integrated into a single module, the car audio system being connected to an antenna for a vehicle and receiving broadcast signals, the system comprising: an antenna-tuner integration module, in which the active antenna for receiving and amplifying the broadcast signals and the tuner unit for selecting a broadcast signal corresponding to a specific frequency among the received broadcast signals are formed as a single module; and a car audio device connected to the antenna-tuner integration module using a data cable of a certain length corresponding to a spaced distance for preventing effects of electrical noise generated by the vehicle

Advantageous Effects

As described above, there is provided a car audio system having a tuner unit and an active antenna integrated into a single module, in which the active antenna for receiving and amplifying broadcast signals and the tuner unit for selecting a broadcast signal corresponding to a specific frequency among the received broadcast signals are formed as a single antenna-tuner integration module, and thus cable loss is prevented, and broadcast receive sensitivity is improved.

In addition, it is possible to prevent degradation of receive sensitivity of broadcast signals by connecting the antenna-tuner integration module and the car audio device using a data cable so that a distance between the antenna-tuner integration module and the car audio device may have a certain length corresponding to a spaced distance for preventing effects of electrical noise generated by the vehicle.

Furthermore, it is possible to reduce manufacturing cost and improve a working process by including multiplexer/demultiplexer circuits at predetermined positions in the antenna-tuner integration module and the car audio device and thus reducing the number of lines used in the data cable connecting the antenna-tuner integration module and the car audio device.

Figure 1:
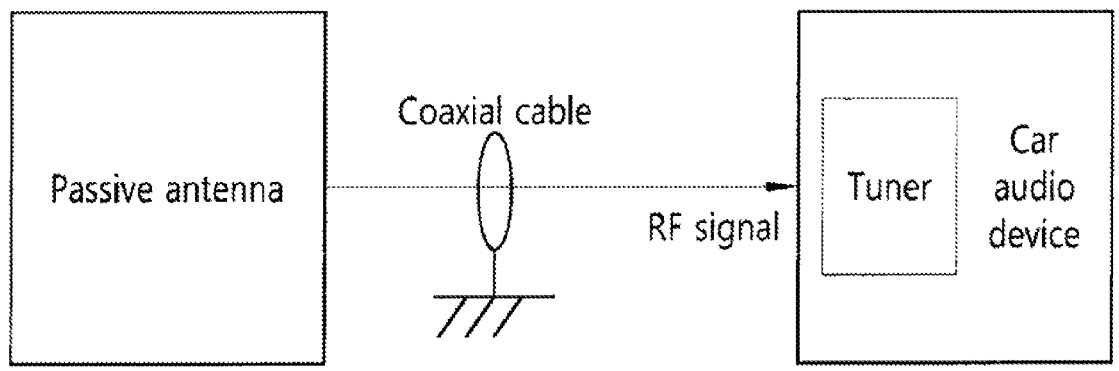
FIG. 1 is a view schematically showing the configuration of a conventional car audio system in which a passive antenna for a vehicle is connected to a car audio device through a coaxial cable.
Figure 2:
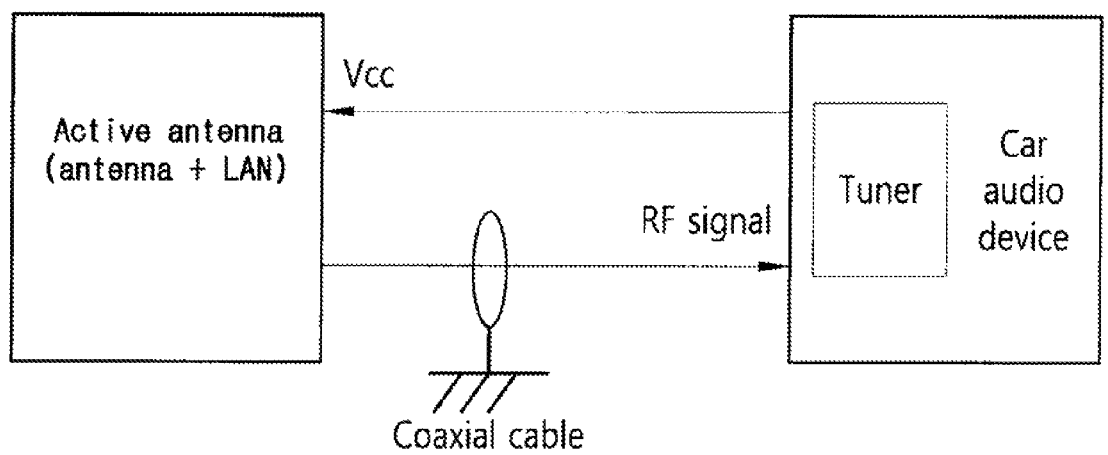
FIG. 2 is a view schematically showing the configuration of a conventional car audio system in which an active antenna for a vehicle is connected to a car audio device through a coaxial cable.

The symbols used in the drawings are as follows.

100, 300: Antenna-tuner integration module
110, 310: Active antenna
111, 311: Antenna matching unit
112, 312: Loe frequency amplification unit
120, 320: Tuner unit
121: Front end
122: PLL unit
123: Analog demodulation unit
124: Power supply
200, 400: Car audio device
210, 410: Audio processor unit
220, 420: Microprocessor unit
230, 430: Power unit
321: RF amplification unit
322: Digital demodulation unit 323: Regulator

BEST MODE FOR CARRYING OUT THE INVENTION

A car audio system having a tuner unit and an active antenna integrated into single module according to an embodiment of the present invention is connected to an antenna for a vehicle and receives broadcast signals, and the car audio system includes an antenna-tuner integration module, in which the active antenna for receiving and amplifying the broadcast signals and the tuner unit for selecting a broadcast signal corresponding to a specific frequency among the received broadcast signals are formed as a single module; and a car audio device connected to the antenna-tuner integration module using a data cable of a certain length corresponding to a spaced distance for preventing effects of electrical noise generated by the vehicle.

Here, the car audio system includes multiplexer/demultiplexer circuits at predetermined positions in order to reduce the number of lines used in the data cable connecting the antenna-tuner integration module and the car audio device.

In addition, the antenna-tuner integration module includes an active antenna containing an antenna matching unit for matching impedance of the vehicle antenna for receiving the broadcast signals to impedance of an internal circuit and a low noise amplification unit for amplifying the broadcast signals inputted through the antenna matching unit; and a tuner unit arranged near the low noise amplification unit to prevent degradation of receive sensitivity and select a broadcast signal corresponding to a specific frequency among the broadcast signals received from the low noise amplification unit.

Meanwhile, the car audio device includes an audio processor unit for outputting the broadcast signal passing through the tuner unit as a voice signal; a microprocessor unit for controlling operation of the tuner unit; and a power unit for supplying normal operation power to the antenna-tuner integration module, the audio processor unit and the microprocessor unit.

Hereinafter, preferred embodiments of the present invention are described in detail with reference to the accompanying drawings.

Figure 3:
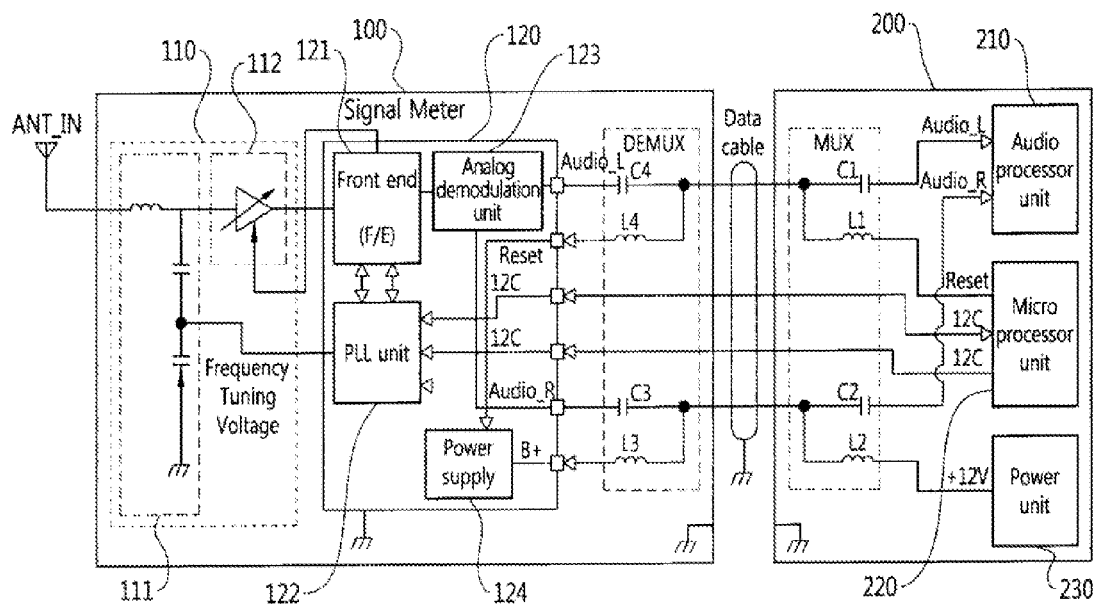
FIG. 3 is a view schematically showing the configuration of a car audio system in which a tuner unit applying an analog method and an active antenna are integrated as a single module according to an embodiment of the present invention.

FIG. 3 is a view schematically showing the configuration car audio system in which a tuner unit applying an analog method and an active antenna are integrated as a single module according to an embodiment of the present invention.

As shown in the figure, the car audio system having a tuner unit and an active antenna integrated into a single module according to an embodiment of the present invention is connected to an antenna for a vehicle and receives broadcast signals, and the car audio system includes en antenna-tuner integration module 100 and a car audio device 200.

Further specifically, the antenna-tuner integration module 100 is formed as a single integrated module including an active antenna 110 for receiving and amplifying broadcast signals and a tuner unit 120 for selecting a broadcast signal corresponding to a specific frequency among the received signals, and the antenna-tuner integration module 100 is spaced apart from the car audio device 200 by a certain distance and connected to the car audio device 200 using a data cable to prevent effects of electrical noise, which is generated by the engine or driving motor of the vehicle to have a frequency band close to a broadcast frequency.

Here, signal loss occurs in a conventional system using a coaxial cable since a high frequency signal of 100 Mhz band flows through the coaxial cable. However, in the car audio system according to an embodiment of the present invention, a data cable only transmits data of a relatively low frequency through communication lines, audio lines and power lines, and thus cable loss is prevented, and broadcast receive sensitivity is improved.

In addition, in the car audio system according to an embodiment of the present invention, the number of signal lines needed to connect the antenna-tuner integration module 100 and the car audio device 200 is seven lines including audio lines (two lines.), communication lines (two lines), a reset line (one line), a power line (one line) and a ground line (one line). At this point, multiplexer/demultiplexer circuits are included at predetermined positions as shown in the figure in order to reduce the number of lines used in the data cable connecting the antenna-tuner integration 100 and the car audio device 200.

Accordingly, the car audio system according to an embodiment of the present invention reduces the number of lines used in the data cable connecting the antenna-tuner integration module 100 and the car audio device 200, and thus cost of materials can be saved, and a wiring work can be efficiently performed in the vehicle.

Meanwhile, the antenna-tuner integration module 100 includes an active antenna 110 containing an antenna matching unit 111 for matching impedance of the vehicle antenna for receiving the broadcast signals to impedance of an internal circuit and a low noise amplification unit 112 for amplifying the broadcast signals inputted through the antenna matching unit 111; and a tuner unit 120 arranged near the low noise amplification unit 112 to prevent degradation of receive sensitivity and select a broadcast signal corresponding to a specific frequency among the broadcast signals received from the low noise amplification unit 112.

Here, the tuner unit 120 includes a front end 121 for converting the broadcast signals received from the low noise amplification unit 112 into an intermediate frequency, amplifying the broadcast signals and outputting a signal meter value in order to adjust a gain value of the low noise amplification unit 112; a PLL unit 122 for transferring a frequency tuning voltage to a tuning circuit of the antenna matching unit 111 so that the broadcast signals inputted into the low noise amplification unit 112 may have a maximum value; an analog demodulation unit 123 for demodulating the broadcast signals passing through the front end 121 and extracting voice signals; and a power supply 124 for receiving operation power from the car audio device 200.

In addition, in the car audio system according to an embodiment of the present invention, the car audio device 200 includes an audio processor unit 210 for outputting the broadcast signal passing through the tuner unit 120 as a voice signal; a microprocessor unit 220 for controlling operation of the tuner unit 120; and a power unit 230 for supplying normal operation power to the antenna-tuner integration module 100, the audio processor unit 210 and the microprocessor unit 220.

Figure 4:
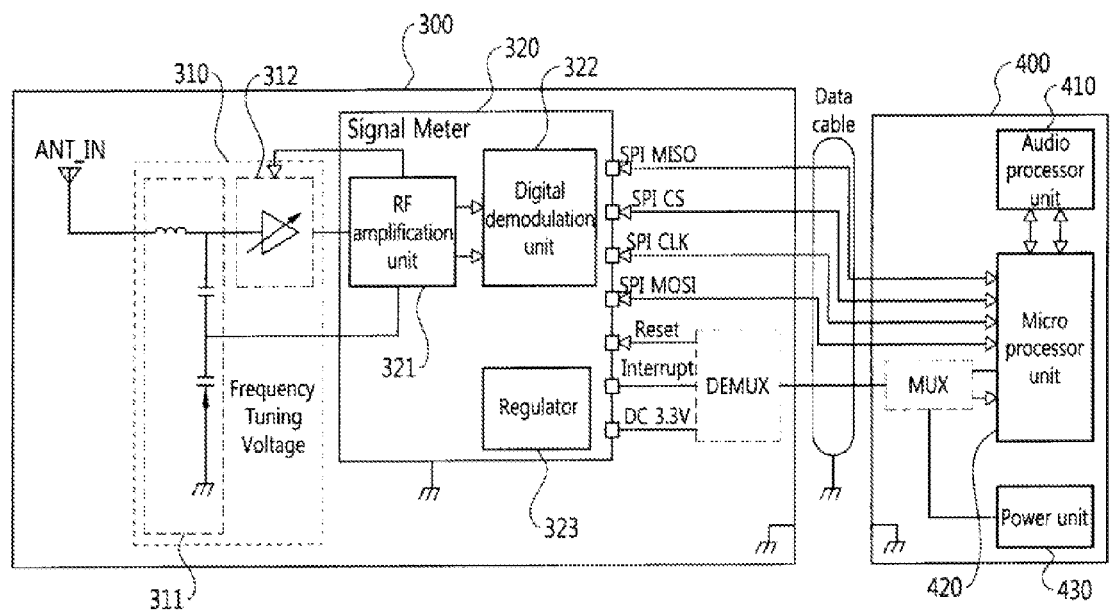
FIG. 4 is a view schematically showing the configuration of a car audio system in which a tuner unit applying a digital method and an active antenna are integrated as a single module according to another embodiment of the present invention.

FIG. 4 is a view schematically showing the configuration of a car audio system in which a tuner unit applying a digital method and an active antenna are integrated as a single module according to another embodiment of the present invention.

As shown in the figure, a car audio system having a tuner unit and an active antenna integrated into a single module according to another embodiment of the present invention is connected to an antenna for a vehicle and receives broadcast signals, and the car audio system includes an antenna-tuner integration module 300 and a car audio device 400.

Further specifically, the antenna-tuner integration module 300 is formed as a single integrated module including an active antenna 310 for receiving and amplifying broadcast signals and a tuner unit 320 for selecting a broadcast signal corresponding to a specific frequency among the received signals, and the antenna-tuner integration module 300 is spaced apart from the car audio device 400 by a certain distance and connected to the car audio device 400 using a data cable to prevent effects of electrical noise, which is generated by the engine or driving motor of the vehicle to have a frequency band close to a broadcast frequency.

Here, since the car audio device 400 and the antenna-tuner integration module 300 are spaced apart from each other by a certain distance to prevent the effects of electrical noise and connected through the data cable, the car audio system according to another embodiment of the present invention prevents cable loss and improves broadcast receive sensitivity compared with a conventional system using a coaxial cable.

In addition, in the car audio system according to another embodiment of the present invention, the number of signal lines needed to connect the antenna-tuner integration module 300 and the car audio device 400 is eight lines including communication lines (four lines), an interrupt line (one line), a reset line (one line), a power line (one line) and a ground line (one line). At this point, multiplexer/demultiplexer circuits are included at predetermined positions as shown in the figure in order to reduce the number of lines used in the data cable connecting the antenna-tuner integration module 300 and the car audio device 400.

Accordingly, the car audio system according to another embodiment of the present invention reduces the number of lines used in the data cable connecting the antenna-tuner integration module 300 and the car audio device 400, and thus cost of materials can be saved, and a wiring work can be efficiently performed in the vehicle Meanwhile, the antenna-tuner integration module 300 includes an active antenna 310 containing an antenna matching unit 311 for matching impedance of the vehicle antenna for receiving the broadcast signals to impedance of an internal circuit and a low noise amplification unit 312 for amplifying the broadcast signals inputted through the antenna matching unit 311; and a tuner unit 320 arranged near the low noise amplification unit 312 to prevent degradation of receive sensitivity and select a broadcast signal corresponding to a specific frequency among the broadcast signals received from the low noise amplification unit 312.

Here, the tuner unit 320 includes an RF amplification unit 321 for converting the broadcast signals received from the low noise amplification unit 312 into an intermediate frequency, amplifying the broadcast signals, outputting a signal meter value in order to adjust a gain value of the low noise amplification unit 312 and transferring a frequency tuning voltage to a tuning circuit of the antenna matching unit 311 so that the broadcast signals inputted into the low noise amplification unit 312 may have maximum value; a digital demodulation unit 322 for converting the broadcast signals passing through the RF amplification unit 321 into digital signals and extracting voice signals by demodulating the digital signals; and a regulator 323 for receiving operation power from the car audio device 400.

In addition, in the car audio system according to another embodiment of the present invention, the car audio device 400 includes an audio processor unit 410 for outputting the broadcast signal passing through the tuner unit 320 as a voice signal; a microprocessor unit 420 for controlling operation of the tuner unit 320; and a power unit 430 for supplying normal operation power to the antenna-tuner integration module 300, the audio processor unit 410 and the microprocessor unit 420.

As described above, the present invention provides a car audio system having a tuner unit and an active antenna integrated into a single module, in which the active antenna for receiving and amplifying broadcast signals and the tuner unit for selecting a broadcast signal corresponding to a specific frequency among the received broadcast signals are formed as a single antenna-tuner integration module, and thus cable loss is prevented, and broadcast receive sensitivity is improved.

In addition, it is possible to prevent degradation of the receive sensitivity of broadcast signals by connecting the antenna-tuner integration module and the car audio device using a data cable so that a distance between the antenna-tuner integration module and the car audio device may have a certain length corresponding to a spaced distance for preventing effects of electrical noise generated by the vehicle.

Furthermore, it is possible to reduce manufacturing cost and improve a working process by including multiplexer/demultiplexer circuits at predetermined positions in the antenna-tuner integration module and the car audio device and thus reducing the number of lines used in the data cable connecting the antenna-tuner integration module and the car audio device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A car audio system having a tuner unit and an active antenna integrated into a single module, the car audio system being connected to an antenna for a vehicle and receiving broadcast signals, the system comprising:
    an antenna-tuner integration module, in which the active antenna for receiving and amplifying the broadcast signals and the tuner unit for selecting a broadcast signal corresponding to a specific frequency among the received broadcast signals are formed as a single module; and
    a car audio device connected to the antenna-tuner integration module using a data cable of a certain length corresponding to a spaced distance for preventing effects of electrical noise generated by the vehicle,
    wherein the antenna-tuner integration module includes:
    the active antenna containing an antenna matching unit for matching impedance of the vehicle antenna for receiving the broadcast signals to impedance of an internal circuit and a low noise amplification unit for amplifying the broadcast signals inputted through the antenna matching unit; and
    the tuner unit arranged near the low noise amplification unit to prevent degradation of receive sensitivity and select a broadcast signal corresponding to a specific frequency among the broadcast signals received from the low noise amplification unit, and
    wherein the tuner unit includes:
    a front end for converting the broadcast signals received from the low noise amplification unit into an intermediate frequency, amplifying the broadcast signals and outputting a signal meter value in order to adjust a gain value of the low noise amplification unit;
    a PLL unit for transferring a frequency tuning voltage to a tuning circuit of the antenna matching unit so that the broadcast signals inputted into the low noise amplification unit may have a maximum value;
    an analog demodulation unit for demodulating the broadcast signals passing through the front end and extracting voice signals; and
    a power supply for receiving operation power from the car audio device.

2. The system according to claim 1, wherein multiplexer/demultiplexer circuits are included at predetermined positions in order to reduce the number of lines used in the data cable connecting the antenna-tuner integration module and the car audio device.

3. The system according to claim 1, wherein the car audio device includes:
    an audio processor unit for outputting the broadcast signal passing through the tuner unit as a voice signal;
    a microprocessor unit for controlling operation of the tuner unit; and
    a power unit for supplying normal operation power to the antenna-tuner integration module, the audio processor unit and the microprocessor unit.

4. A car audio system having a tuner unit and an active antenna integrated into a single module, the car audio system being connected to an antenna for a vehicle and receiving broadcast signals, the system comprising
    an antenna-tuner integration module, in which the active antenna for receiving and amplifying the broadcast signals and the tuner unit for selecting a broadcast signal corresponding to a specific frequency among the received broadcast signals are formed as a single module: and
    a car audio device connected to the antenna-tuner integration module using a data cable of a certain length corresponding to a spaced distance for preventing effects of electrical noise generated by the vehicle,
    wherein the antenna-tuner integration module includes:
    the active antenna containing an antenna matching unit for matching impedance of the vehicle antenna for receiving the broadcast signals to impedance of an internal circuit and a low noise amplification unit for amplifying the broadcast signals inputted through the antenna matching unit; and
    the tuner unit arranged near the low noise amplification unit to prevent degradation of receive sensitivity and select a broadcast signal corresponding to a specific frequency among the broadcast signals received from the low noise amplification unit, and
    wherein the tuner unit includes:
    an RF amplification unit for converting the broadcast signals received from the low noise amplification unit into an intermediate frequency, amplifying the broadcast signals, outputting a signal meter value in order to adjust a gain value of the low noise amplification unit and transferring a frequency tuning voltage to a tuning circuit of the antenna matching unit so that the broadcast signals inputted into the low noise amplification unit may have a maximum value;
    a digital demodulation unit for converting the broadcast signals passing through the RF amplification unit into digital signals and extracting voice signals by demodulating the digital signals; and
    a regulator for receiving operation power from the car audio device.

* * * * *